(12) United States Patent
Bridges

(10) Patent No.: US 6,847,436 B2
(45) Date of Patent: Jan. 25, 2005

(54) CHOPPER-STABILIZED ABSOLUTE DISTANCE METER

(75) Inventor: Robert E. Bridges, Kennett Square, PA (US)

(73) Assignee: Faro Laser Trackers, LLC, Lake Mary, FL (US)

( * ) Notice: Subject to any disclaimer, the term of this patent is extended or adjusted under 35 U.S.C. 154(b) by 0 days.

(21) Appl. No.: 10/119,664

(22) Filed: Apr. 10, 2002

(65) Prior Publication Data

US 2003/0020895 A1 Jan. 30, 2003

Related U.S. Application Data

(60) Provisional application No. 60/282,462, filed on Apr. 10, 2001.

(51) Int. Cl.[7] .............................. G01C 3/08; G01C 1/00
(52) U.S. Cl. ..................................................... 356/4.02
(58) Field of Search ........................ 356/4.01, 5.01–5.15

(56) References Cited

U.S. PATENT DOCUMENTS

| | | | |
|---|---|---|---|
| 3,619,058 A | * | 11/1971 | Hewlett |
| 3,973,911 A | | 8/1976 | VON Smolinski et al. |
| 4,068,952 A | * | 1/1978 | Erbert et al. |
| 4,269,506 A | * | 5/1981 | Johnson et al. |
| 4,636,068 A | * | 1/1987 | Niiho et al. |
| 4,942,561 A | * | 7/1990 | Ohishi et al. |
| 5,054,911 A | | 10/1991 | Ohishi et al. |
| 5,886,777 A | * | 3/1999 | Hirunuma ................... 356/5.12 |
| 6,062,190 A | | 5/2000 | Nakajima |
| 6,356,344 B1 | * | 3/2002 | Ohishi et al. |
| 6,384,904 B1 | * | 5/2002 | Ohishi et al. ............... 356/5.13 |

OTHER PUBLICATIONS

PCT Search Report PCT/US 02/11288.

* cited by examiner

Primary Examiner—Bernarr E. Gregory
Assistant Examiner—Brian Andrea
(74) Attorney, Agent, or Firm—Cantor Colburn LLP

(57) ABSTRACT

An absolute distance measurement device is provided, including reference and measurement laser signal paths, comprising a laser source providing a laser signal and a chopper assembly, comprising a rotatable surface defining at least one aperture provided through a portion of the rotatable surface; wherein the laser signal is directed to different points on the rotatable surface of the chopper assembly such that as the rotatable surface is rotated, the aperture selectively permits transmission and selectively prevents transmission of each of said at least two laser signal paths.

31 Claims, 10 Drawing Sheets

CHOPPER-STABILIZED ABSOLUTE DISTANCE METER

CROSS REFERENCE TO RELATED APPLICATIONS

This application claims the benefit of priority to U.S. Provisional Patent Application Ser. No. 60/282,462, filed Apr. 10, 2001, the entire contents of which are specifically incorporated herein by reference.

BACKGROUND

Generally, an absolute distance meter (ADM) is a device that determines the distance to a remote target. It does this by sending laser light to the target and then collecting light that the target reflects or scatters. An ADM may be used to measure distances in one dimension or it may be attached into a more complex device having the ability to measure quantities corresponding to additional dimensions (degrees of freedom).

An example of such a device is a laser tracker, which measures three-dimensional spatial coordinates. The laser tracker sends a laser beam to a retroreflector target that is held against a surface of interest or placed into a fixed nest. The most common type of retroreflector target is the spherically mounted retroreflector (SMR), which may comprise a cube-corner retroreflector mounted within a sphere with the vertex of the cube-corner at the sphere center.

A gimbal mechanism within the laser tracker may be used to direct a laser beam from the tracker to the SMR. Part of the light retroreflected by the SMR enters the laser tracker and passes onto a position detector. A control system within the laser tracker can use the position of the light on the position detector to adjust the rotation angles of the mechanical azimuth and zenith axes of the laser tracker to keep the laser beam centered on the SMR. In this way, the tracker is able to track an SMR that is moved over the surface of an object of interest.

Part of the light retroreflected into the laser tracker may also be passed into a distance-measuring device (distance meter) such as an interferometer or ADM. Angular encoders attached to the mechanical azimuth and zenith axes of the tracker may also measure the azimuth and zenith angles of the laser beam (with respect to the tracker frame of reference). The one distance measurement and two angle measurements performed by the laser tracker are sufficient to completely specify the three-dimensional location of the SMR.

A general comparison of interferometric distance measuring and absolute distance measurement follows. In the laser tracker, an interferometer (if present) may determine the distance from a starting point to a finishing point by counting the number of increments of known length (usually the half-wavelength of the laser light) that pass as a retroreflector target is moved between the two points. If the beam is broken during the measurement, the number of counts cannot be accurately known, causing the distance information to be lost. By comparison, the ADM in a laser tracker determines the absolute distance to a retroreflector target without regard to beam breaks. Because of this, the ADM is said to be capable of "point-and-shoot" measurement.

Although there are several sources of error in an interferometer measurement, in most cases the dominant error is in the value of the average wavelength of the laser light over its path through the air. The wavelength at a point in space is equal to the vacuum wavelength of the laser light divided by the index of refraction of the air at that point. The vacuum wavelength of the laser is usually known to high accuracy (better than one part in 10,000,000), but the average refractive index of air is known less accurately. The refractive index of air is found by first using sensors to measure the temperature, pressure, and humidity of the air and then inserting these measured values into an appropriate equation, such as the Ciddor equation or the Edlin equation.

However, the temperature, pressure, and humidity are not uniform over space, and neither are the sensors perfectly accurate. For example, an error in the average temperature of one degree Celsius causes an error in the refractive index of about one part per million (ppm). As mentioned above, the wavelength of light in air is inversely proportional to the air refractive index.

Similarly, in an ADM, the so-called ADM wavelength (also known as the ambiguity range) is inversely proportional to the air refractive index. Because of this similarity, errors in measuring temperature, pressure, and humidity cause errors in calculated distance that are approximately equal for ADM and interferometer systems.

However, ADMs are prone to errors not found in interferometers. To measure distance, an interferometer uses an electrical counter to keep track of the number of times that two beams of light have gone in and out of phase. The counter is a digital device that does not have to respond to small analog differences. By comparison, ADMs are usually required to measure analog values, such as phase shift or time delay, to high precision.

To understand the difficulties faced by ADMs, we consider three common ADM architectures: the electrical-reference architecture, the optical-reference architecture, and the optical-mixing architecture. In most high-performance ADMs, laser light is modulated, either by applying an electrical signal to the laser source or by sending the laser light through an external modulator such as an acousto-optic modulator or electro-optic modulator. This laser light is sent out of the ADM to a remote target, which might be a retroreflector or a diffuse surface. Light reflects or scatters off the remote target and passes, at least in part, back into the ADM.

Systems based on the optical-mixing architecture are usually called coherent systems. In these systems, the returning laser light is mixed with laser light from another location before being sent to an optical detector that converts the light into an electrical signal. This electrical signal is then decoded to determine the distance from the ADM to the remote target.

Systems that are not coherent are based on one of the other two architectures. In the electrical-reference architecture, the electrical signal from the optical detector is directly compared to the electrical modulation signal applied to the laser or external modulator. In the optical-reference architecture, the electrical signal from the optical detector is compared to the electrical signal output from a second optical detector in the so-called reference channel. In this architecture, modulated laser light is provided to two parallel channels: a measurement channel whose light passes to the remote target and a reference channel whose light stays near the ADM. The reference and measurement channels contain substantially similar elements: similar optics, similar detectors, and similar electronics.

The electrical-reference architecture may suffer from imperfect conversion of electrical modulation into optical modulation. In addition, all three architectures are subject to drift and repeatability errors caused by optical and electrical elements. Optical fibers used in ADM systems, for example, change optical path length with temperature. This problem can be minimized by attempting to match optical fibers in the reference and measurement channels in length and location. Electrical assemblies used in ADM systems, such as amplifiers and filters, cause the modulated signal to undergo a temperature-dependent phase shift. In the optical-reference architecture, this problem can be minimized by attempting to match the temperature-dependent phase shift of the electrical components in the reference and measurement channels. Generally, however, short-term repeatability errors and long-term drift (especially related to changes in ambient temperature) are problematic for ADMs with any architecture. Both short-term repeatability errors and long-term drift errors are examples of a more general category referred to as stability errors.

Laser trackers suffer another kind of error in the measurement of distance regardless of whether the distance meter is an ADM or an interferometer. This type of error is usually referred to an R0 (R-zero) error. In a laser tracker, light is considered to pass through a pivot point, also referred to as a gimbal point. It is desirable to reference all distances measured by an ADM or interferometer to this gimbal point. To do this, a magnetic nest designed to kinematically support the SMR is rigidly attached to the body of the laser tracker. Ordinarily, this nest, which is said to be located at the home position, is attached below the exit aperture of the laser tracker so that it does not block the laser beam during measurements. A procedure, referred to as an R0 compensation, is carried out to determine the R0 distance from the gimbal point to the home position. During the course of measurements, the SMR is occasionally brought to the home position and the distance reset to the R0 distance. For the interferometer, this provides a simple means of recovering from a broken laser beam. For the ADM, it provides a way of removing electrical or thermal drift.

The metal of the tracker housing expands or contracts with temperature, so the R0 value increases or decreases correspondingly. It is possible to correct the R0 value in real time to partially account for this expansion. This is done by embedding one or more temperature sensors within the metal body of the tracker and then using this measured temperature to correct for the thermal expansion of the metal. However, this procedure is not perfect because neither the average temperature of the metal nor the coefficient of thermal expansion of the metal are exactly known. Because the expansion or contraction in R0 is proportional to the product of the length R0, the coefficient of thermal expansion, and the change in temperature, it follows that the magnitude of the error in the corrected R0 measurement increases in direct proportional to the R0 distance. Unfortunately, this R0 distance is necessarily non-zero since the nest at the home position is mounted to the body of the tracker.

SUMMARY

The above discussed and other drawbacks and deficiencies of the prior art are overcome or alleviated by the absolute distance measurement device described herein, including reference and measurement laser signal paths, comprising a laser source providing a laser signal and a chopper assembly, comprising a rotatable surface defining at least one aperture provided through a portion of the rotatable surface; wherein the laser signal is directed to different points on the rotatable surface of the chopper assembly such that as the rotatable surface is rotated, the aperture selectively permits transmission and selectively prevents transmission of each of said at least two laser signal paths.

The above discussed and other features and advantages of the chopper-stabilized absolute measurement device will be appreciated and understood by those skilled in the art from the following detailed description and drawings.

BRIEF DESCRIPTION OF THE DRAWINGS

Referring now to the drawings, wherein like elements are numbered alike in the several FIGURES.

DETAILED DESCRIPTION OF THE PREFERRED EMBODIMENTS

Reference will now be made in detail to the preferred embodiments of the present invention, examples of which are illustrated in the accompanying drawings. The present invention provides an ADM that uses a chopper to improve measurement stability and, if incorporated into a laser tracker, to reduce R0 error.

Exemplary Laser Tracker Characteristics

Figure 1:
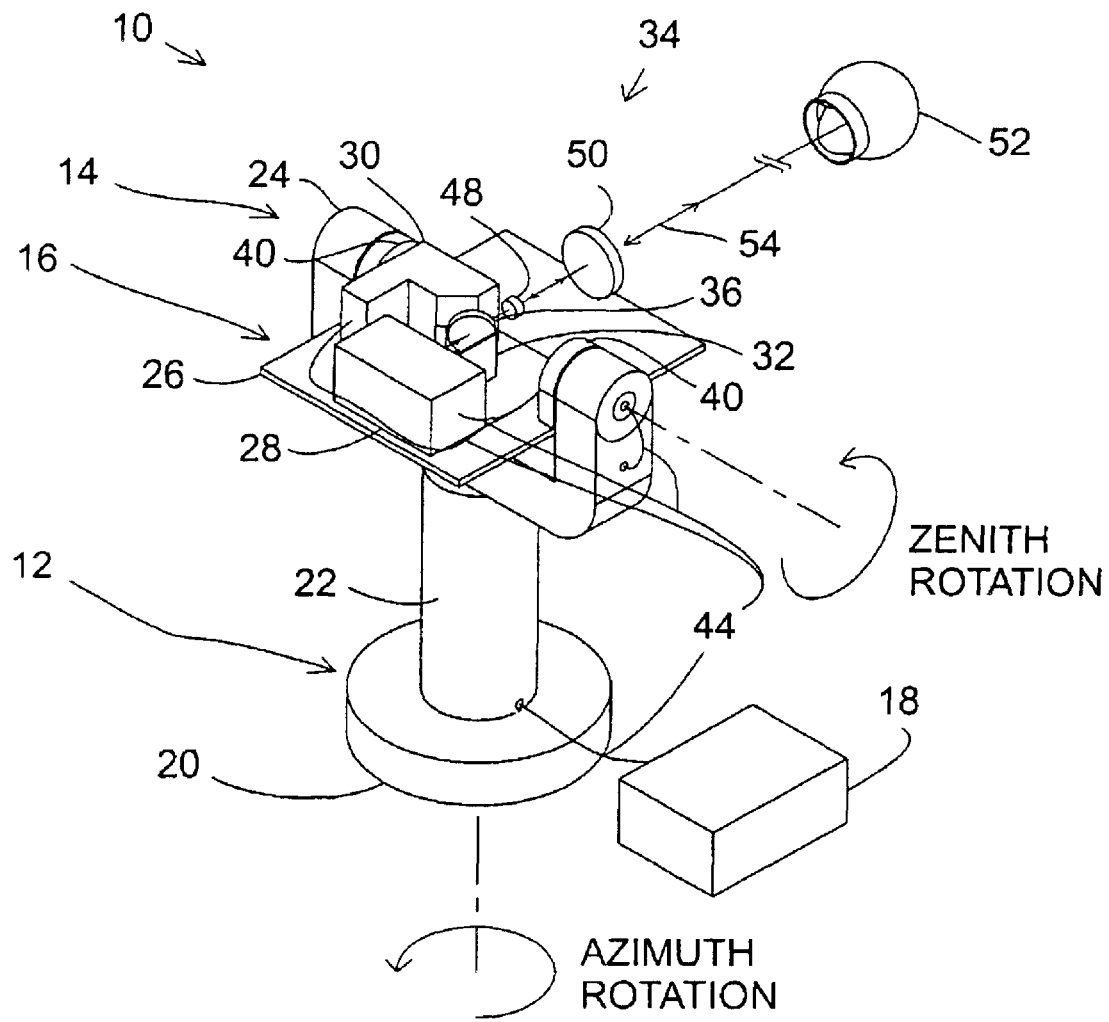
FIG. 1 depicts in perspective view an exemplary laser tracker sending a laser beam to an SMR, where selected components of the laser tracker are represented as blocks.

Referring now to FIG. 1, a perspective view of an exemplary laser tracker 10 sending a laser beam to an SMR is illustrated. The exemplary laser tracker generally comprises an azimuth-axis assembly 12, a zenith-axis assembly 14, a payload assembly 16, and an auxiliary assembly 18. An exemplary azimuth-axis assembly 12 comprises a base mount 20, an azimuth-axis outer structure 22, an azimuth-axis inner shaft (not shown), azimuth-axis bearings (not shown), an azimuth-axis motor (not shown), and an azimuth-axis angular encoder (not shown). Various exemplary features of the azimuth-axis assembly 12 are described below. The base mount 20 may be designed to secure the laser tracker 10 to an instrument stand or similar structure. The azimuth-axis outer structure 22 may attach to the base mount 20 and may be stationary with respect to the base mount 20. Azimuth-axis bearings, azimuth-axis motor, and an azimuth-axis angular encoder may fit between the azimuth-axis inner shaft and the azimuth-axis outer structure 22. The azimuth-axis bearings may permit the azimuth-axis inner shaft to rotate smoothly with low friction. The azimuth-axis motor may rotate the inner azimuth-axis shaft to any desired azimuth angle. The azimuth-axis angular encoder may measure the azimuth angle of the azimuth-axis inner shaft.

The exemplary zenith-axis 14 is described, comprising a yoke 24, zenith-axis inner shaft (not shown), zenith-axis bearings (not shown), a zenith-axis motor (not shown), and a zenith-axis angular encoder (not shown). Various exemplary features of the zenith-axis assembly 14 are described below. The yoke 24 may be rigidly attached to the azimuth-axis inner shaft so that the entire zenith-axis assembly 14 rotates along with the azimuth-axis inner shaft. The yoke 24 may be bent into a U-like shape, and the zenith-axis inner shaft may be inserted into holes drilled in the yoke 24. The zenith-axis bearings, zenith-axis motor, and zenith-axis angular encoder may fit between the zenith-axis inner shaft and the surface of the yoke holes. The zenith-axis bearings may permit the zenith-axis inner shaft to rotate smoothly with low friction. The zenith-axis motor may rotate the inner zenith-axis shaft to any desired zenith angle. The zenith-axis angular encoder may measure the zenith angle of the zenith-axis inner shaft.

Figure 2:
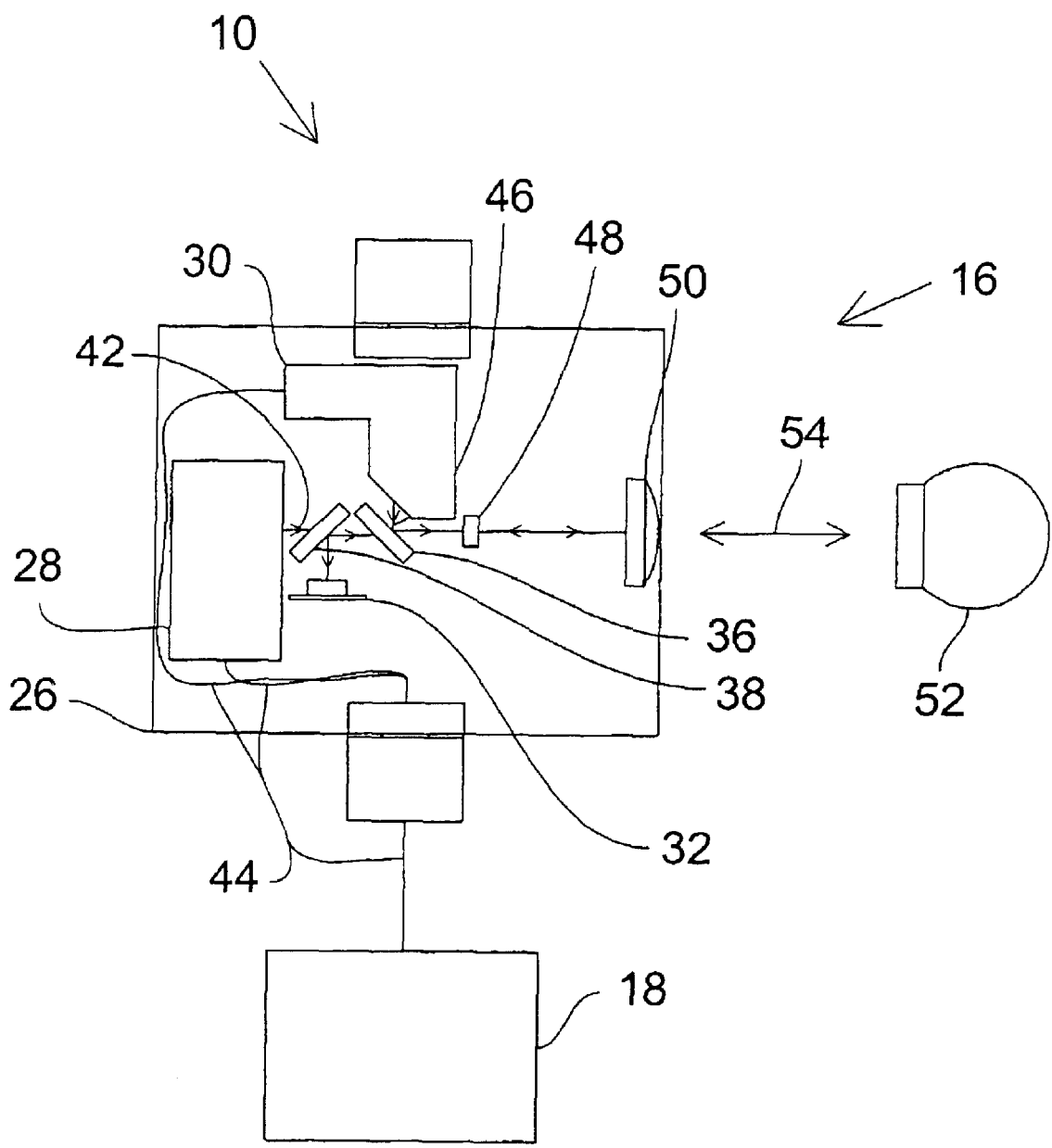
FIG. 2 depicts in top view the exemplary laser tracker of FIG. 1.

Referring now to FIGS. 1 and 2, an exemplary payload assembly 16 is illustrated. The payload assembly may generally comprise a mounting plate 26, an optoelectronic assembly 28, an ADM-chopper assembly 30, a position-detector assembly 32, a beam-expander assembly 34, and beam splitters 36, 38. An exemplary mounting plate 26 comprises a flat plate or similar rigid structure onto which are attached two mounting flanges 40. The zenith-axis inner shaft may attach securely to mounting flanges 40, thereby causing the rotation of the zenith and azimuth axes to be transferred to the payload assembly 16.

Referring still to FIGS. 1 and 2, the exemplary optoelectronic assembly emits visible laser light, shown generally at 42. In an exemplary embodiment the laser light 42 is generated in a laser source (not shown) located in an auxiliary assembly 18 and transmitted over optical fibers 44 routed through the azimuth-axis and zenith-axis assemblies, as shown in FIGS. 1 and 2. In another exemplary embodiment, the laser (not shown) may be mounted within the optoelectronic assembly 28 located on the mounting plate 26. Optionally, the optoelectronic assembly 28 may also contain an interferometer (not shown) capable of incremental distance measurement.

Referring still to FIGS. 1 and 2, the exemplary ADM-chopper assembly 30 emits laser light (shown generally at 46) at a different wavelength than that emitted by the optoelectronic assembly 28. In one exemplary embodiment, the ADM-chopper laser light 46 has a wavelength that is in the eye-safe region of the near-infrared spectrum, for example approximately 1550 nm. In an exemplary embodiment, the laser light 46 emitted by the ADM-chopper assembly 30 is generated by a laser located in the auxiliary assembly 18 and transmitted over optical fiber 44 routed through the azimuth-axis 12 and zenith-axis 14 assemblies.

Referring now to the exemplary arrangement illustrated at FIG. 2, laser light from the optoelectronic assembly 28 first passes through a partially transmitting beam splitter 38, in which only a small fraction of the light is reflected and most of the light is transmitted. It then passes through a dichroic beam splitter 36 that transmits the visible light 42 from the optoelectronic assembly 28, but reflects light 46 from the ADM-chopper assembly 30. Following the dichroic beam splitter 36, the laser light from the optoelectronic assembly 28 and ADM-chopper assembly 30 are combined into one composite laser beam. This composite laser beam passes through a first lens 48, which is either concave or convex, of a beam expander assembly (34 in FIG. 1), and then through a second lens 50, which is convex, of the beam expander. In exemplary embodiment, the spacing between the principal planes of the two lenses 48, 50 is set equal to the sum of the focal lengths of the two lenses 48, 50 thereby producing an afocal beam expander that converts a collimated incident beam into a collimated output beam.

Referring again to FIGS. 1 and 2, exemplary operation of the exemplary laser tracker 10 will be described. The composite laser beam 54 leaves the laser tracker 10 and travels to a target, e.g. a spherically mounted retroreflector 52 (SMR). If the center of the laser beam 54 strikes the vertex of the cube-corner retroreflector (not shown) located at the center of the SMR 52, then the reflected light retraces the path of the incident light. The composite laser beam 54 re-enters the tracker 10 and is reduced in size as it passes through the two lenses 50, 48 of the beam expander 34. The dichroic beam splitter 36 reflects the ADM laser light, which in an exemplary embodiment has a wavelength in the infrared region, into the ADM-chopper assembly 30 and transmits the rest of the light, which in an exemplary embodiment has a wavelength in the visible region. The partially transmitting beam splitter 38 reflects a small amount of the light onto the position detector assembly 32 and transmits the rest of the light into the optoelectronic assembly 28. The position detector assembly 32 is adjusted so that a laser beam 52 that strikes the center of the SMR 52 also strikes the center of the position detector assembly 32. If the laser beam does not strike the position detector assembly 32 at its center, then an electrical error signal is generated, causing the motors of the azimuth-axis 12 and zenith-axis 14 (not shown) assemblies to steer the laser beam 54 toward the SMR 52 center. In an exemplary embodiment, in which an interferometer is present in the optoelectronic assembly 28, the light that passes into the optoelectronic assembly 28 may be analyzed with optical and electrical components to incrementally measure the distance to the SMR 52.

Referring still to FIGS. 1 and 2, an exemplary arrangement of the exemplary payload assembly 16 and the exemplary auxiliary assembly 18 is described. Optical signals are routed through optical fibers 44 and electrical signals are routed through electrical wires 44 from components on the payload assembly 16 to components in the auxiliary assembly 18. The auxiliary assembly 18 may contain lasers, optical components, and electrical components as required for the functioning of the laser tracker and its devices. Some exemplary components within this box are discussed in more detail below.

Referring now to FIG. 2 even in an exemplary embodiment, wherein an interferometer is included in the optoelectronic assembly 28, a primary purpose of the optoelectronic assembly 28 is to send visible light to the SMR 52, which in turn passes onto the position detector assembly 32. Visible light can provide the tracker operator with a valuable visual clue as to the whereabouts of the laser beam. Also, position detectors available in the visible region cost less and perform better than position detectors available for 1550 nm.

In another exemplary embodiment, the ADM uses laser light in the visible region and neither an interferometer nor an optoelectronic assembly is utilized.

The ADM-Chopper Assembly

Figure 3:
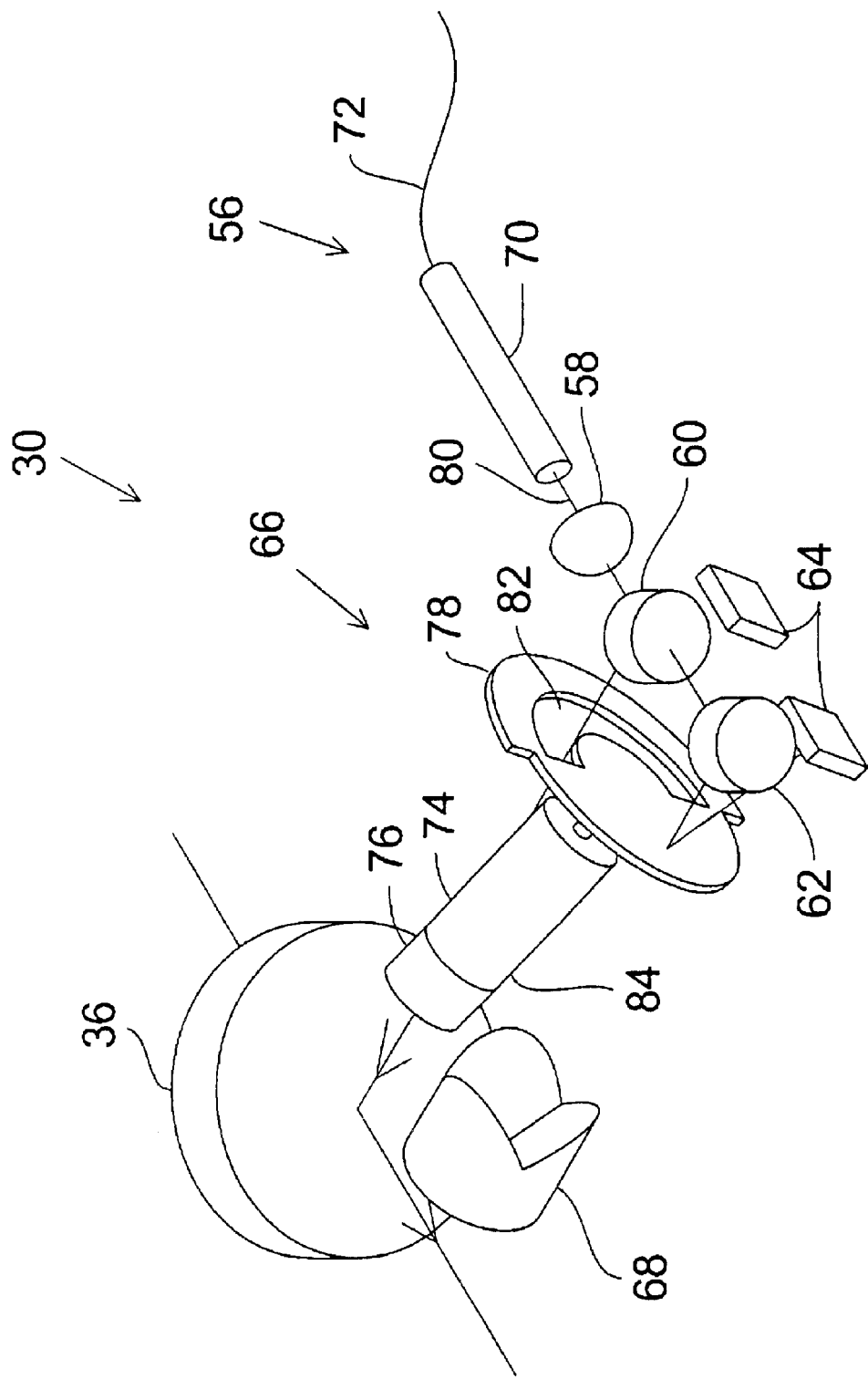
FIG. 3 depicts in perspective view exemplary components of an ADM-chopper assembly with laser light sent to a beam splitter.
Figure 4:
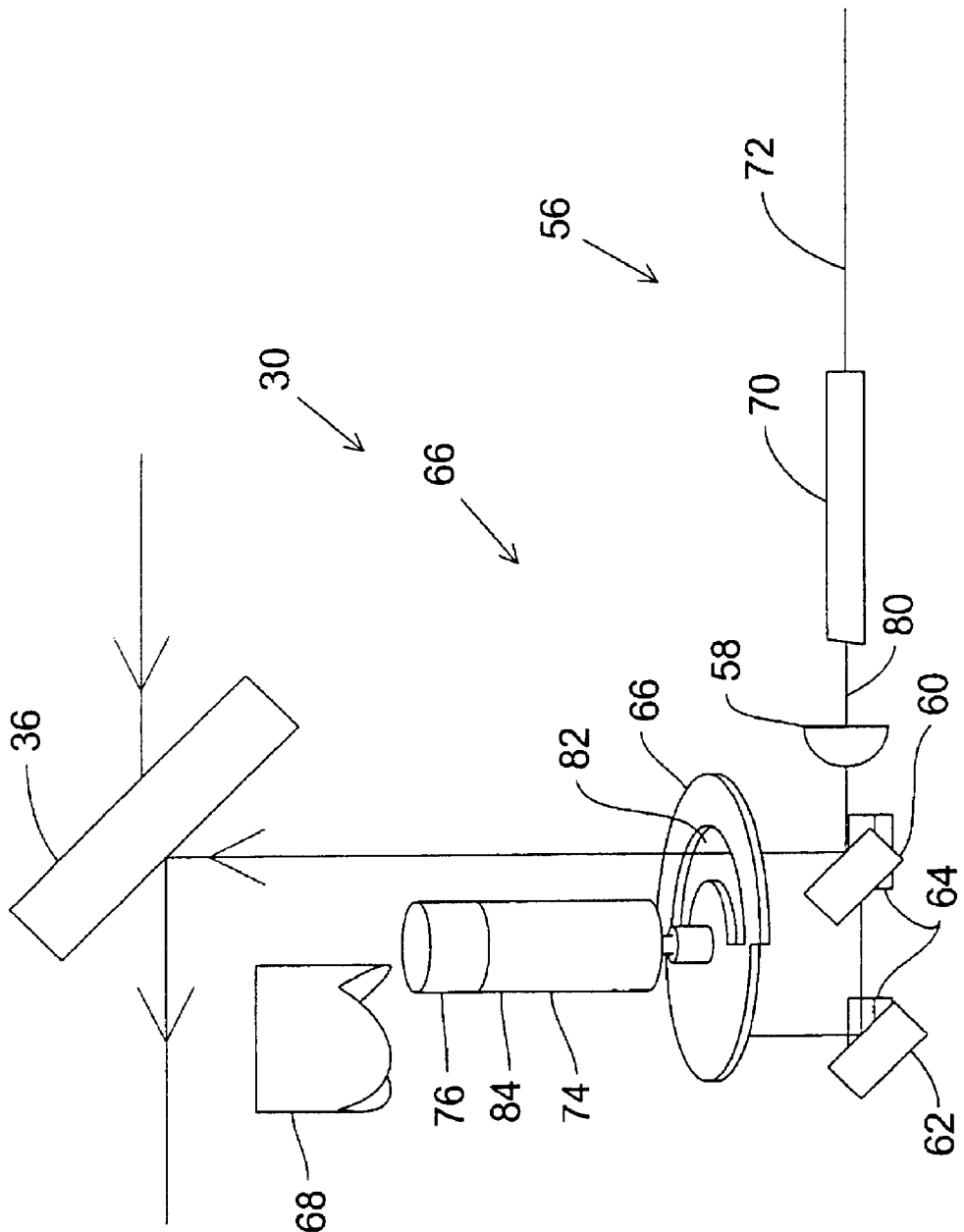
FIG. 4 depicts in top view the exemplary ADM-chopper assembly of FIG. 3.

Referring now to FIGS. 3–6, exemplary components of the ADM-chopper assembly 30 are illustrated, along with the dichroic beam splitter 36 (also shown in FIGS. 1 and 2). FIGS. 3 and 4 depict an exemplary case in which the laser beam is passed through the chopper assembly 66 to the dichroic beam splitter 36.

In an exemplary embodiment, the ADM-chopper assembly 30 comprises a ferrule-fiber assembly 56, a collimating lens 58, an ADM beam splitter 60, a reference mirror 62, beam blocks 64, a chopper assembly 66, and an internal reference retroreflector 68. As shown in FIGS. 3 and 4, the illustrated exemplary ferrule-fiber assembly 56 comprises a ferrule 70 into which has been secured, e.g. by epoxy, an optical fiber 72 that is attached to the ADM laser in the auxiliary assembly (18 in FIG. 1). The illustrated exemplary chopper assembly 66 comprises a chopper motor 74, an angle sensor 76, and a chopper plate 78.

Referring still to FIGS. 3 and 4, light 80 emerges from the optical fiber 72 of the ferrule-fiber assembly 56 and is collimated by the collimating lens 58. The ADM beam splitter 60 reflects part of the light and sends it onto the dichroic beam splitter 36 through an aperture 82 in the chopper plate 78. The ADM beam splitter 60 transmits the rest of the light to the reference mirror 60 that reflects the light onto the chopper plate 78. Exemplary descriptions and configurations of the exemplary components are described below.

In an exemplary embodiment, the chopper plate 78 includes a reflective finish, e.g. a polished metal surface, so that light reflects onto one of the beam blocks 64 rather than scattering back into the optical fiber 72. Such back scattering of unwanted optical light may compromise accuracy in some types of ADMs.

Referring still to FIGS. 3 and 4, an exemplary beam block comprises a small plate of neutral-density absorbing glass coated with a thin anti-reflection dielectric film. In an exemplary embodiment the back 84 of the chopper motor 74 is tilted upward such that reflected laser light is directed downward to a beam block 64. Light reflected by the SMR 52 (shown in FIG. 1) retraces its path to the dichroic beam splitter 36 in the laser tracker 10. The laser light reflects from the dichroic beam splitter 36 to the ADM beam splitter 60 and then is focused by the collimating lens 58 onto the core of the optical fiber 72.

Figure 5:
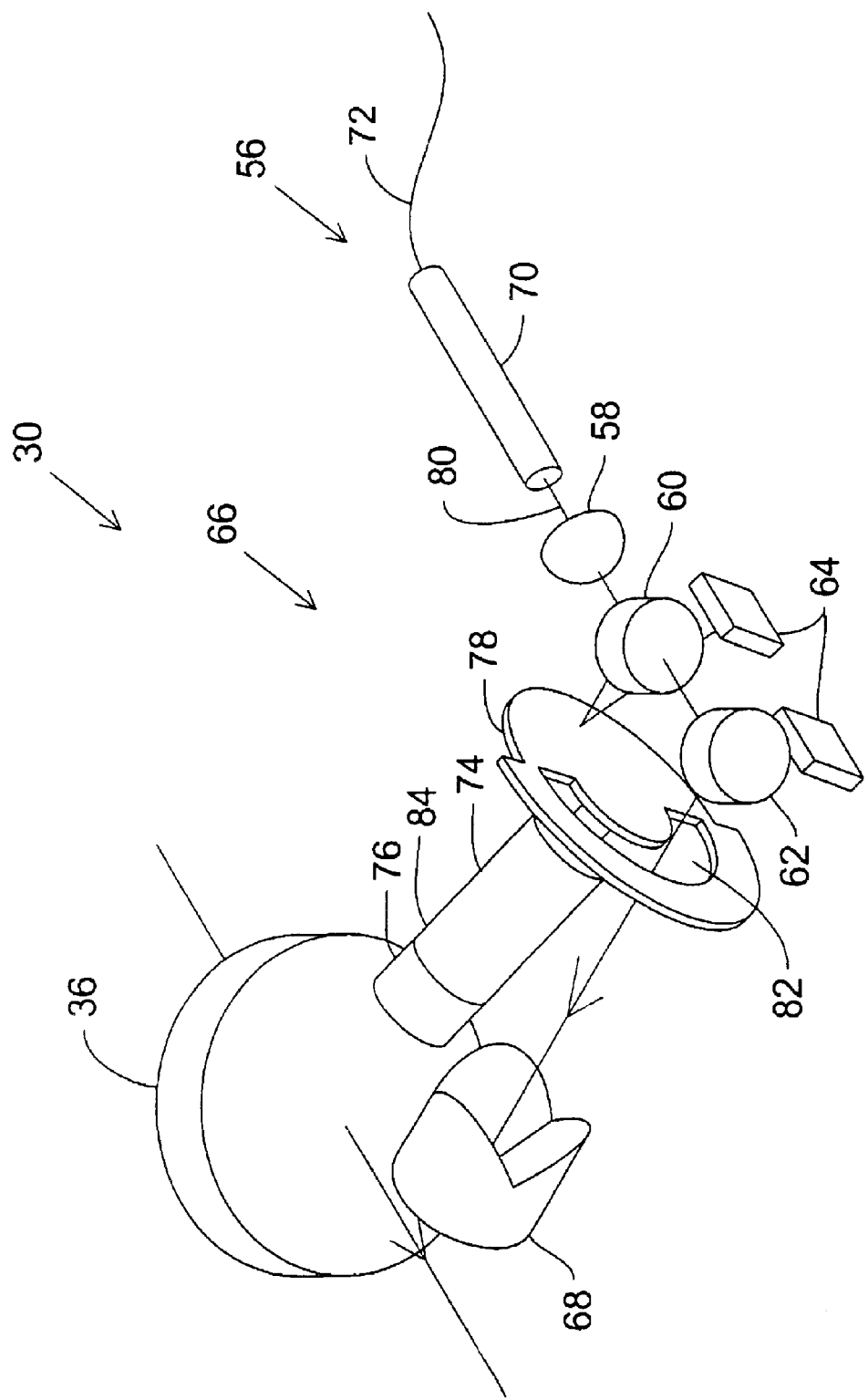
FIG. 5 depicts in perspective view exemplary components of an ADM-chopper assembly with laser light sent to an internal retroreflector.
Figure 6:
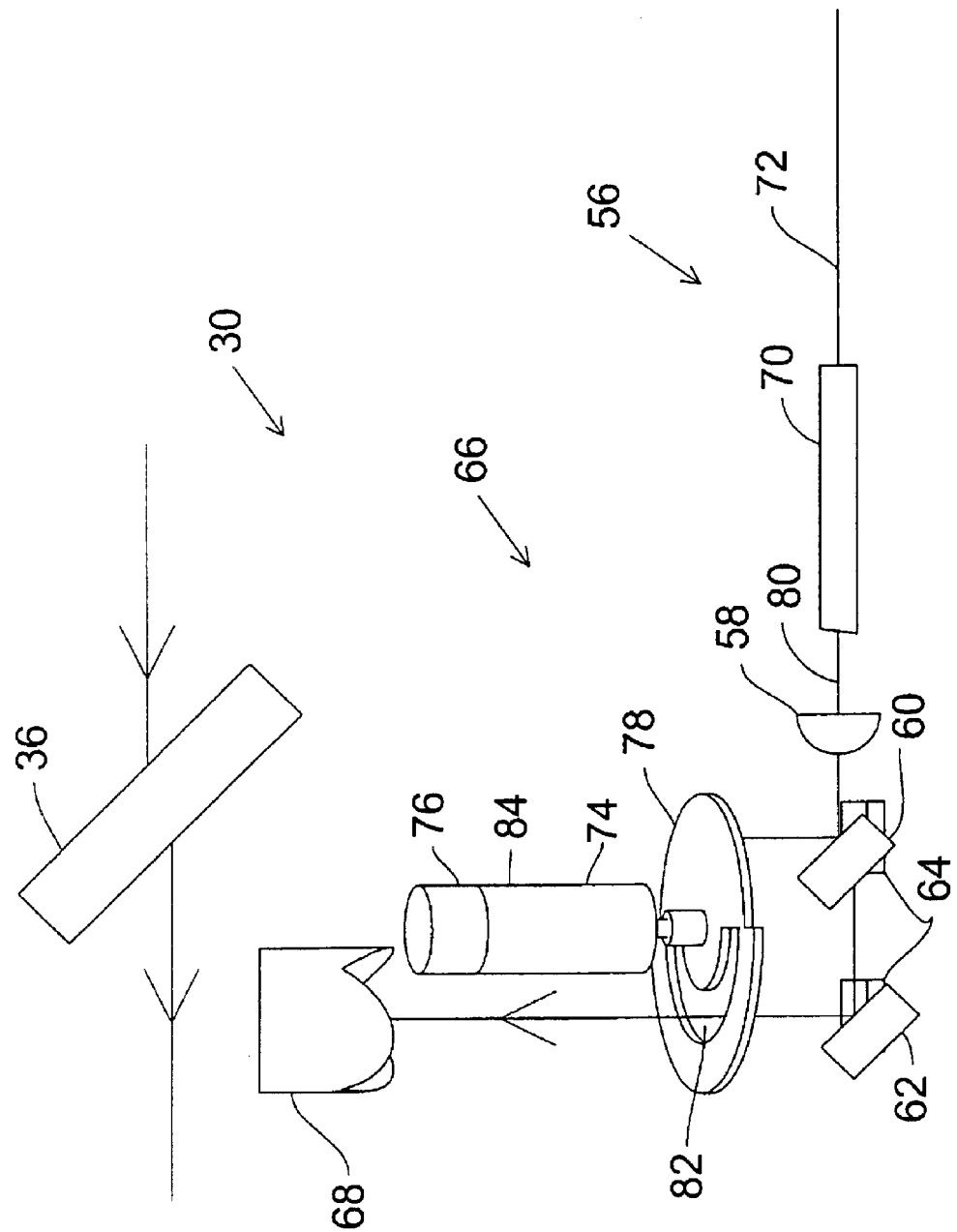
FIG. 6 depicts in top view the exemplary ADM-chopper assembly of FIG. 5.

Referring now to FIGS. 5 and 6, the ADM-chopper assembly 30 is illustrated in a second exemplary configuration. In FIGS. 5 and 6, the chopper plate 78 has rotated into a position that allows laser light to be reflected onto an internal reference retroreflector. As the chopper plate rotates, it alternately sends light to the dichroic beam splitter and internal reference retroreflector. In one exemplary embodiment, the internal reference retroreflector 68 is a cube-corner retroreflector. The center of the laser beam strikes the vertex of the cube corner. The laser beam then retraces its path back into the core of the optical fiber 72. As the chopper plate 78 rotates, an angle sensor 76, which in one exemplary embodiment is a Hall-effect sensor, indicates the angle of the chopper plate 78. This angle then determines whether at each instant the ADM laser light passes to the SMR 52 or to the internal reference retroreflector 68.

Referring still to FIGS. 5 and 6, in one exemplary embodiment, the chopper plate 78 contains only one aperture 82 (though more than one aperture 82 is contemplated) in order to maximize the time in which measurements can be made, as explained below. In an exemplary embodiment, measurements are generally not performed during those times in which the laser beam is sent partly to the dichroic beam splitter 36 and partly to the internal reference retroreflector 68. For example, consider the case in which the laser beam has a Gaussian profile and a diameter of 0.6 millimeter (mm) after being launched from the optical fiber. The effective diameter of the laser beam is greater than 0.6 mm because the Gaussian profile has a tail that extends outside the 0.6 mm beam diameter and also because the laser beam may be larger on the return path from the SMR 52. For these reasons, the laser beam may generally be treated as having an effective diameter of perhaps 2 mm. If the laser beam passes 5 mm to the left and right of the chopper-motor 74 shaft, the laser beam intersects the aperture 82 over an arc length of pi times 5 mm or approximately 16 mm. The distance-measuring function is deactivated over an arc distance of twice the beam diameter, or 4 mm. In other words, measurements can be made during 12/16=75% of the chopper rotation. In such a case, increasing the number of apertures in the chopper plate 78 decreases the time available for the distance-measuring function. In an exemplary embodiment, the centroid of the chopper plate 78 is located on the axis of rotation to ensure that the chopper plate 78 rotates smoothly.

Figure 7:
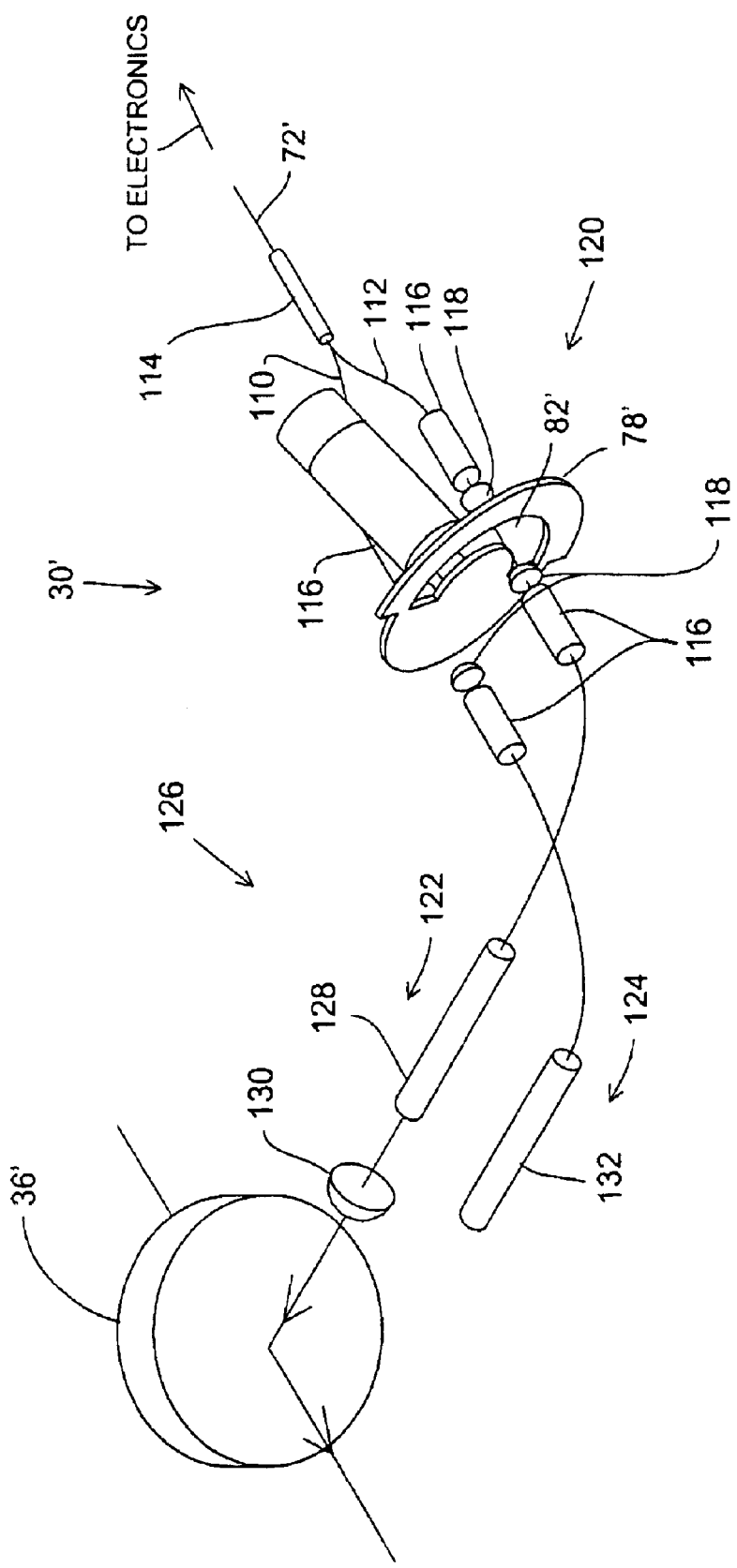
FIG. 7 depicts in perspective view exemplary components of an ADM-chopper assembly with laser light sent to an internal retroreflector.
Figure 8:
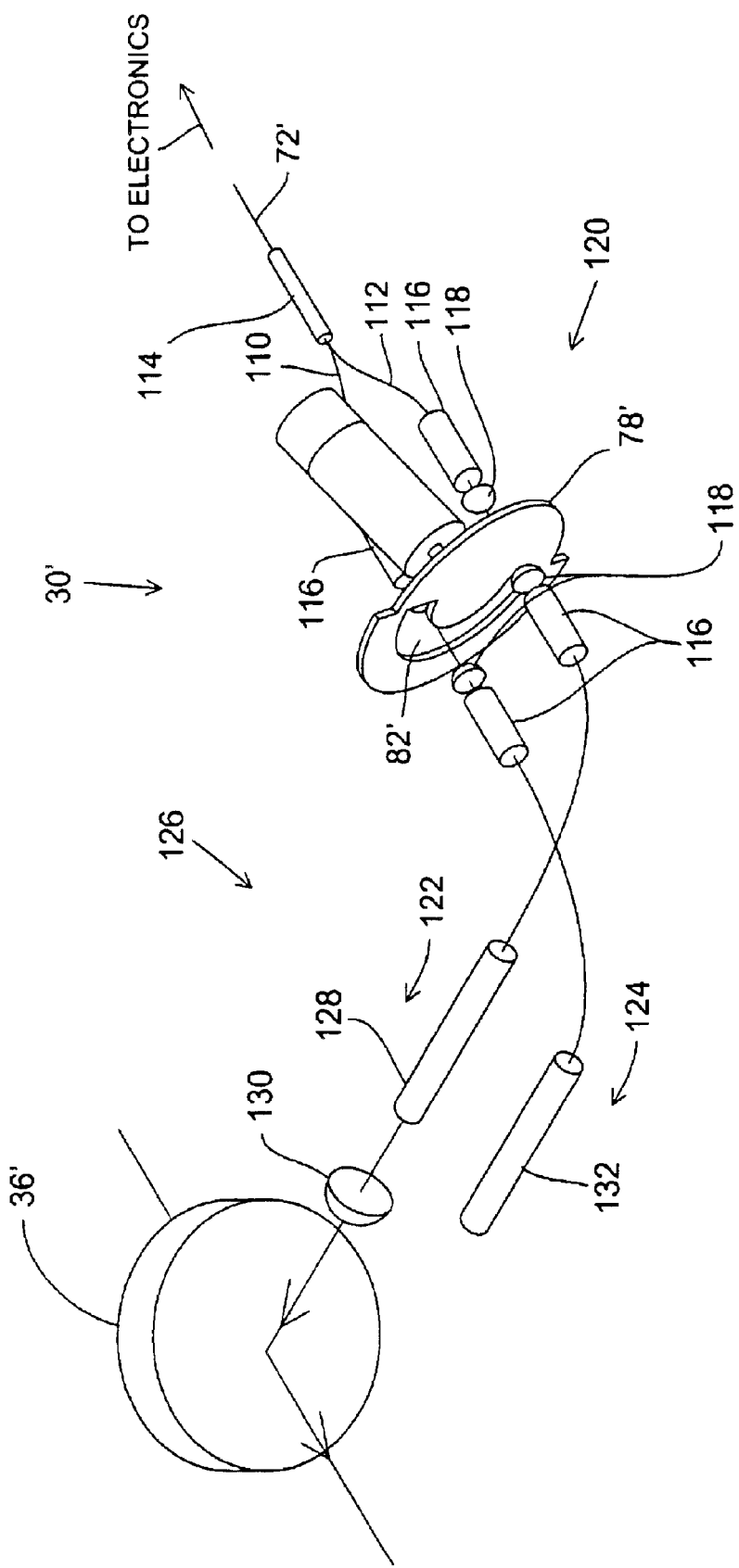
FIG. 8 depicts in top view the exemplary ADM-chopper assembly of FIG. 7.

Referring now to FIGS. 7 and 8, another exemplary embodiment of the chopper-stabilized ADM assembly is illustrated generally at 30'. A laser source (e.g., 88 in FIG. 9) provides a laser signal through an optical fiber 72'. In the illustrated exemplary embodiment, the laser signal is directed to different points of a chopper plate 78' by a fiber optic coupler 114 and by two optical fibers 110, 112. Ferrules 116 and lenses 118 are shown between the optical fibers 110, 112 and the different points on the chopper plate 78'.

Thus, in the illustrated exemplary embodiment, laser light travels in the optical fiber 72' and is split by a fiber-optic coupler 114 into two paths, a measurement path 122 and a reference path 124. The light in the fibers passes into a fiber bench 120, which comprises four ferrules 116 and four lenses 118. One of the lenses 118 collimates the light traveling in the measurement path 122, and another lens 118 collimates the light traveling in the reference path 124.

Referring now to FIG. 7, the aperture 82' of the chopper plate 78' is illustrated in such a position as to pass the laser light in the measurement path 122 but block the light in the reference path 124. The light travels to a launch assembly 126 comprising a ferrule 128 and lens 130. The lens 130 collimates the light and reflects it off a dichroic beamsplitter 36' to a remote retroreflector (not shown). The light from the retroreflector retraces its path until it passes through the fiber-optic coupler 114. It then travels to an optical detector and electronics box, as in FIG. 9 below, which determines the distance from the tracker to the retroreflector target.

Referring now to FIG. 8, the aperture 82' of the chopper plate 78' is illustrated in such a position as to pass the laser light in the reference path 124 but block the light in the measurement path 122. In the illustrated exemplary embodiment, the light travels to a fiber retroreflector 132 and then retraces its path until it passes through the fiber-optic coupler 114 and into the electronics as described above.

Referring again to FIGS. 7 and 8, in one exemplary embodiment, the optical fibers in the reference 124 and measurement 122 paths, respectively, are matched, e.g., such that their lengths are the same.

Figure 9:
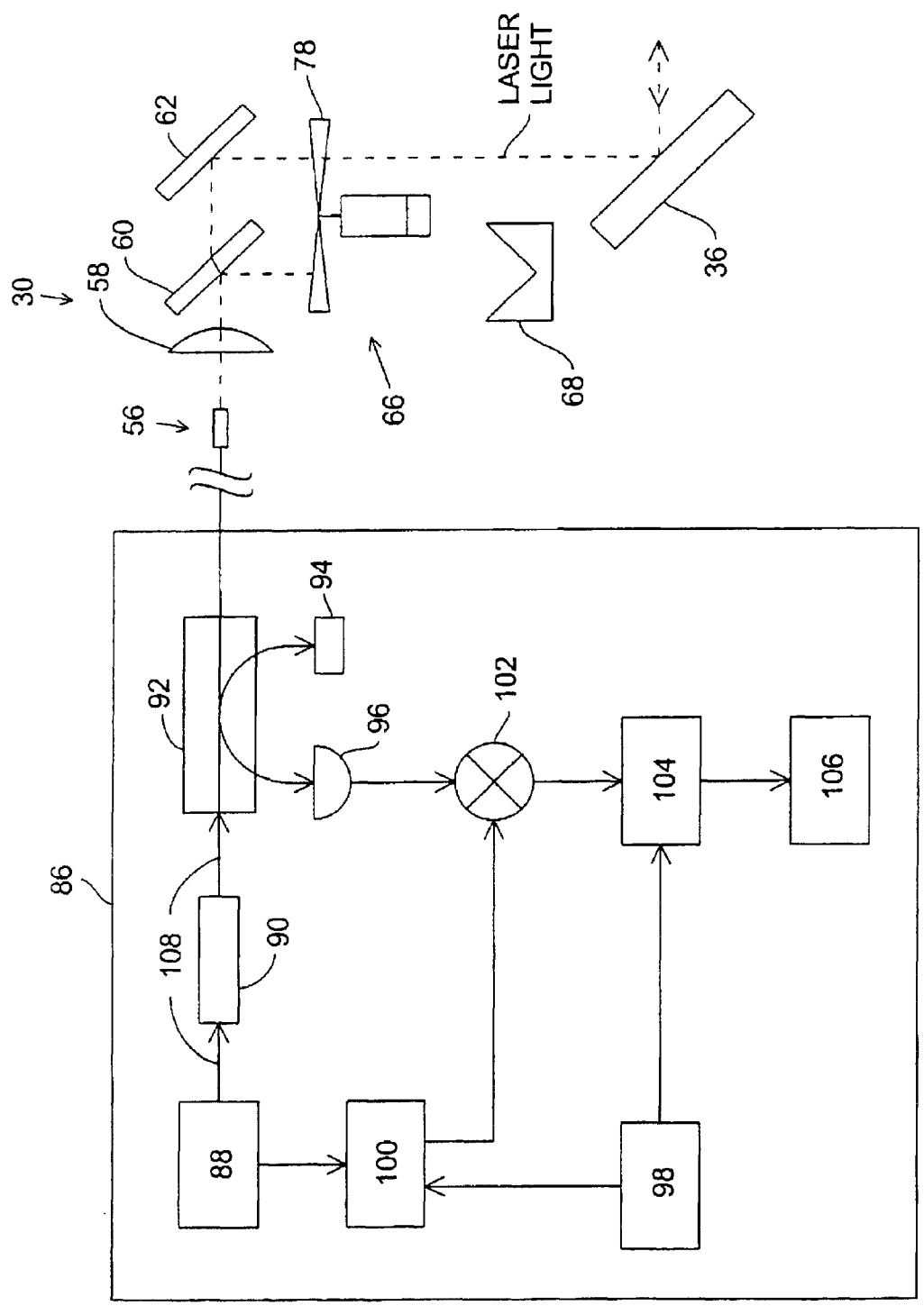
FIG. 9 depicts schematically exemplary elements of ADM and ADM-chopper assemblies.

Generally, the ADM-chopper assembly 30 can be used with any type of ADM. Referring now to FIG. 9, an exemplary ADM determines distance by measuring the phase shift of intensity-modulated laser light. Certain exemplary elements of the ADM-chopper Assembly 30 illustrated by FIGS. 3–6 are shown schematically on the right side of FIG. 9. These illustrated elements include a dichroic beam splitter 36, an internal reference retroreflector 68, a chopper assembly 66, a reference mirror 62, an ADM beam splitter 60, a collimating lens 58, and a ferrule-fiber assembly 56. The left of FIG. 9 shows an exemplary ADM-optoelectronic assembly 86, which maybe located inside the auxiliary assembly 18. The illustrated exemplary ADM-optoelectronic assembly 86 comprises a laser 88, an isolator

90, a coupler 92, a low-reflection termination (LRT) 94, an optical detector 96, a reference oscillator 98, an electrical signal generator 100, a mixer 102, a phase meter 104, and a microprocessor 106.

In an exemplary embodiment, the reference oscillator 98 is an oven-controlled crystal oscillator (OCXO) that emits a sine wave having a known frequency (e.g., 20 megahertz (MHz)) stable to, e.g. approximately 1 part in 10,000,000 per year. The electrical signal generator 100 may use the signal from the reference oscillator 98 to produce a stable electrical sine-wave signal at a higher frequency (e.g., 3 gigahertz (GHz)). This signal may be applied to a modulation port of a semiconductor laser 88, which in one embodiment, is a distributed feedback laser, which may have an exemplary output wavelength of approximately 1550 nanometers (nm), among others. The exemplary 3-GHz electrical sine wave modulates the output power of the laser light (intensity modulation).

Referring still to the exemplary embodiment illustrated by FIG. 9, modulated laser light exits the laser 88 through an optical fiber 108, e.g., a pigtailed optical fiber, and travels through the isolator 90, e.g. a Faraday isolator. The Faraday isolator 90 permits light to pass in only one direction, thereby preventing the laser 88 from being destabilized by light that may otherwise enter it in the reverse direction. The laser light passes into an optical coupler 92, e.g. a 50:50 optical coupler, that sends half of the laser light into the LRT 94 and the other half out of the ADM-optoelectronic assembly 86. This outgoing light travels to the ferrule-fiber assembly 56 and launches into free space, traveling alternately to the SMR 52 and internal reference reflector 68.

Whether the light passes through to the SMR 52 or to the internal reference reflector 68, the retroreflected light retraces its path, re-enters the optical fiber in the ferrule-fiber assembly 56, and travels back to the optical coupler 92. The coupler 92 sends half of the light to the Faraday isolator 90, where it is absorbed, and the other half to the optical detector 96.

Referring still to FIG. 9, in an exemplary embodiment, the electrical output signal from the optical detector 96 may be applied to, e.g. a radio-frequency (RF) port of the mixer 102. A local oscillator (LO) signal (e.g., 3.000002 GHz) generated by the electrical signal generator 100 is applied to the LO port of the mixer 102. The mixer 102 may produce an intermediate frequency (IF) equal to the 2-kHz difference in the RF and LO signals. The IF signal from the mixer 102, along with the signal from the reference oscillator 98, are sent to the phase meter 104. The phase meter 104 divides the 20-MHz reference signal down to 2-kHz then compares the phase of this 2-kHz signal to that of the 2-kHz IF. The microprocessor 106 uses the succession of phase values to determine the distance from the internal reference retroreflector 68 to the SMR 52.

As the chopper plate 78 rotates, the optical signal returned to the optical detector 96 alternates between the signal that has traveled to the SMR 52 and the signal that has traveled to the internal reference retroreflector 68. The difference in the phase between these alternate measurements is used to determine the distance from the internal reference retroreflector 68 to the SMR 52. The difference in phase varies from 0 to 360 degrees over a distance, called the ambiguity range L, according to $L=c/2f_m n_g$, where c is the speed of light in a vacuum, $f_m$ is the modulation frequency, and $n_g$ is the group index of refraction of the laser light in air. For example, if the modulation frequency is 3-GHz, then the ambiguity range is approximately equal to $L \cong 3 \cdot 10^8/(2)(3 \cdot 10^9)(1)$ m=50 mm. Since the SMR 52 may be located many meters from the laser tracker 10, there may be many complete ambiguity ranges L between the internal reference retroreflector 68 and the SMR 52. If there are M complete ambiguity ranges and if the phase meter 104 measures $\phi$ radians, then the distance d from the internal reference retroreflector 68 to the SMR 52 is $d=L(M+\phi/2\pi)$.

The number M of complete ambiguity ranges L is initially determined by lowering the modulation frequency fm and then recalculating the distance from the internal reference retroreflector 68 to the SMR 52. For example, suppose that the modulation frequency fm is lowered to $f_{m2}$=3 MHz. The ambiguity range $L_2$ for this lower frequency is then $L_2$=c/$2f_{m2}n_g$, which is approximately equal to $L_2 \cong 3 \cdot 10^8/(2)(3 \cdot 10^6)(1)$=50 m. If the phase meter 104 of FIG. 9 can determine the phase to an accuracy of $10^{-4}$ radian, then the distance $L_2$ is known to an accuracy of better than 1 mm, which is adequate to determine the number M for a 50-mm ambiguity range.

Figure 10:
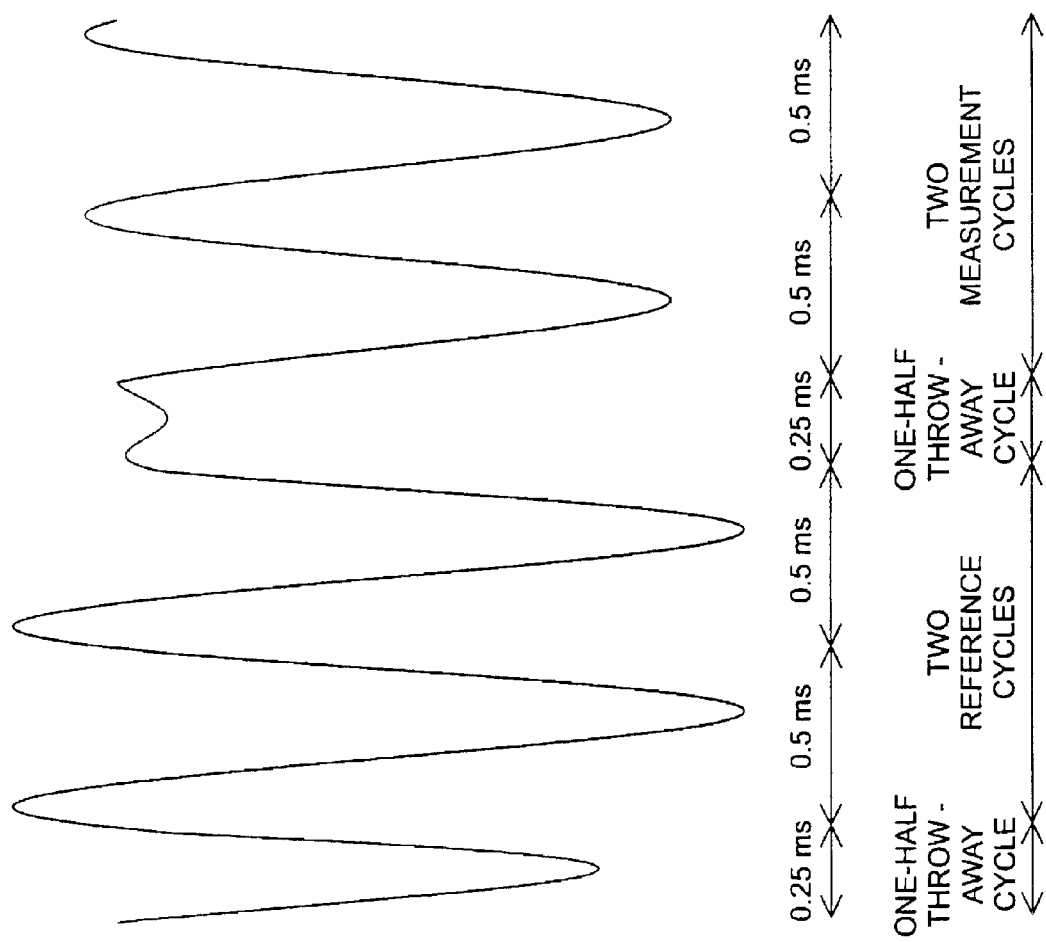
FIG. 10 depicts the pattern of the intermediate-frequency (IF) electrical signal in the exemplary ADM.

After the number M is determined, it is not necessary to re-measure M unless the ADM beam is broken. A beam break can be detected by monitoring the average power of the sine wave during each cycle of the IF signal. For example, suppose that the chopper plate 78 rotates at 400 Hz. If the IF is 2-kHz, then 5 cycles of the IF signal are detected each time the chopper plate 78 goes around once, as shown in FIG. 10. Of these five cycles, one is a throwaway cycle, two are measurement cycles (corresponding to the SMR 52 distance), and two are reference cycles (corresponding to the internal-retroreflector distance). In this example, the maximum time to detect a beam break is the time to complete two reference cycles, one throwaway cycle, and one measurement cycle, which equals 2 ms. The number M is correctly determined in every case if the SMR 52 moves in the radial direction by less than 0.4 times the ambiguity range (0.4×50 mm=20 mm) during this time. Consequently, the ADM can detect a beam break for an SMR 52 traveling as fast as 20 mm/2 ms=10 m/s. The human arm cannot move an SMR 52 faster than about 6 m/s, so it is not necessary to determine M unless the beam has been broken.

In general, due to the buildup of manufacturing tolerances, the azimuth and zenith mechanical axes do not exactly lie on the same plane. The length of the line segment that extends from the azimuth axis to the zenith axis and that is perpendicular to both axes is called the axis-offset distance (AXOF). The point at which this line segment intersects the azimuth axis is called the tracker origin. The distance from the zenith axis to the internal reference retroreflector is called the RIR (R Internal Retroreflector) distance.

An exemplary laser tracker 10 has two modes of operation: frontsight mode and backsight mode. To change from frontsight mode to backsight mode, the laser tracker 10 rotates the azimuth axis by 180 degrees, and then flips the zenith axis to reverse the sign of the zenith angle, thereby sending the laser beam back in the original direction. If the laser beam is aimed at a target that lies in the horizon (a horizontal laser beam), then the effect of changing from frontsight to backsight mode is to reverse the position of the zenith axis with respect to the azimuth axis. Specifically, if the zenith axis sits in front of the azimuth axis in frontsight mode, then it sits in back of the azimuth axis in backsight mode, and vice versa. During a measurement, the distance from the zenith axis to the SMR 52 is $d_z=L(M+\phi/2\pi)+RIR$ in either frontsight or backsight mode. If the z axis points in the direction of the azimuth axis and the angle θ extends from the z axis to the line that connects the tracker origin to the SMR, then the distance from the tracker origin to the SMR 52 is equal to $d_O = \text{AXOF} \sin \theta + \sqrt{d_Z^2 - (\text{AXOF} \cos \theta)^2}$ in frontsight mode and $d_O = \sqrt{(d_Z - \text{AXOF} \sin \theta)^2 - (\text{AXOF} \cos \theta)^2}$ in backsight mode, where the value of $\theta$ is that measured in frontsight mode. Because AXOF is typically less than 10 micrometers, it is much smaller than the measured distance $d_Z$. Consequently, to a very good approximation, the equations reduce to the following: $d_O = d_{ZFS} + \text{AXOF} \sin \theta$ for frontsight mode and $d_O = d_{ZBS} - \text{AXOF} \sin \theta$ for backsight mode. In this equation, the symbol $d_Z$ has been replaced with $d_{ZFS}$ or $d_{ZBS}$ to indicate that the measurement has been made in frontsight or backsight mode. Note that the same symbol $d_O$ is used to represent the distance with respect to the tracker origin for both frontsight and backsight measurements since the same value should be obtained in either case.

As the formulas above suggest, laser-tracker distance measurements are usually referenced to the tracker origin. To do this (by performing the calculations given above), it is desirable to determine the values of AXOF and RIR before beginning to make measurements. We will now discuss an exemplary compensation procedure used to determine these parameters. The first exemplary step is to set up two nests (not shown) so that an SMR 52 has the same height when placed in either nest. The second exemplary step is to move the laser tracker outside of the two SMR 52 target positions and adjust the location, height, and orientation of the laser tracker so that the laser beam from the tracker intersects the two SMR 52 target positions. The ADM in the laser tracker then measures the distance to each target. One distance is subtracted from the other to determine the distance D between the targets. Non-zero values of AXOF and RIR cause an error in the measured distance from the tracker 10 to each target; however, these errors cancel out when one distance is subtracted from the other to determine the distance D. A third exemplary step is to move the laser tracker 10 between the two SMR 52 targets and adjust the location and orientation of the laser tracker 10 to center the tracker origin between the two SMR 52 target positions. With the tracker 10 placed in frontsight mode, the ADM measures the distance $D_{1FS}$ to the first target and the distance $D_{2FS}$ to the second target. A fourth exemplary step is to place the laser tracker into backsight mode. The ADM measures the distance $D_{1BS}$ to the first target and the distance $D_{2BS}$ to the second target.

The value of AXOF is found by substituting the values above into the following equation:

$$\text{AXOF} = (D_{1F} + D_{2F} - D_{1B} - D_{2B})/4. \quad (1)$$

The value of RIR is found from the following equation:

$$\text{RIR} = (2D - D_{1F} - D_{2F} - D_{1B} - D_{2B})/4. \quad (2)$$

Exemplary Advantages of a Chopper Assembly

Provision of a chopper, such as in the ADM-chopper assembly 30 illustrated by the various FIGURES, within an ADM assembly provides significant advantages. Exemplary of these advantages is the ability: (1) to remove errors in optical, electrical, or optoelectronic components; and (2) to provide a stable internal reference position that minimizes the R0 error. We will now discuss these errors and the way in which a chopper may remove them.

Generally, optical components can create errors if they change the state of the laser light in such a way as to produce inaccuracies or compromise stability in the measured distance. Optical fibers and optical-fiber components, such as couplers and isolators, may be used in any of the three ADM architectures discussed above. Compared to free-space optical components, fiber-optic components cost less and perform better in several ways: spatial quality of laser light, back reflection, and pointing stability.

Spatial quality of laser light affects the range of the ADM, as well as the consistency of the optical-detector response. The spatial quality of laser light emitted from semiconductor lasers is often poor. In many cases, the beams are elliptical rather than round, and the laser beam profile is usually far from the ideal Gaussian shape. Optical fibers then act as spatial filters to improve the quality of laser beams. After propagating through a sufficient length of fiber (possibly coiled to aid the filtering action), laser light emerges from the fiber with a nearly Gaussian beam profile.

Back reflection can be problematic in some types of ADMs where high accuracy is desired. Optical fibers and optical-fiber components provide much smaller optical back reflections than free-space optical components. For example, it is often possible to obtain fiber-optic components and optical connections that reflect less than one part per million of optical power. By comparison, it can be difficult to obtain free-space optical components that reflect even as little as one part per thousand.

Pointing stability affects the stability of detector response and the alignment of the ADM beam with the visible beam from the optoelectronic assembly. The temporal response of optical detectors is often different near the edges of the detector than near the center. In a fiber-pigtailed optical detector, the laser light strikes the surface of the detector in almost the same place regardless of where the laser light strikes the SMR, thereby improving the consistency of response.

However, despite these advantages, the use of optical fiber introduce inaccuracies into a measurement system. The index of refraction of optical fibers changes with temperature, and the relative change in the index of refraction is multiplied by the length of the optical fiber to determine the change in the optical path length of the fiber. Ordinarily this change in optical path length shows up as an error in the measured distance. One methodical way to minimize this error is to occasionally place the SMR back into the home position and reset the reference distance to the R0 value. Of course, this is not a good alternative if the SMR cannot be frequently brought back to the home position. Another way to minimize the error is to match fiber lengths and locations in the measurement channel and reference channel (if present). However, optical fibers are never identical in their composition or core cross-section, so this is not a perfect solution.

Electrical components used within ADM assemblies also create errors by causing temporal phase to vary with time. Every electrical component has the potential to create this sort of phase variability, especially as a function of temperature. Examples include cables, filters, amplifiers, and mixers. Many of these problems can be reduced, but not eliminated, by the careful selection and matching of electrical components. Electrical components are also susceptible to cross talk caused by radiated or conducted interaction among components in parallel channels. Optoelectronic components may cause drift or jitter. For example, even matched optical detectors respond slightly differently to the properties of light (power, spatial distribution, and polarization) and temperature.

As presently described, provision of the present chopper within an ADM assembly advantageously removes such errors in optical, electrical and optoelectrical components. A solution to the optical, electrical, and optoelectronic problems discussed above is to use the chopper to multiplex a single channel between the reference signal (from light that has traveled to the internal reference retroreflector) and the measurement signal (from light that has traveled to the SMR). Since the optical, electrical, and optoelectronic components are shared by the two signals, all of the temporal variations of a few milliseconds or longer are common mode. Consequently, they are eliminated when the phase of the reference signal is subtracted from the phase of the measurement signal. Furthermore, the potential for cross talk between parallel physical channels is eliminated by this scheme.

Additionally, provision of the present chopper within an ADM assembly advantageously provides a stable internal reference position that minimizes the R0 error. Ordinarily, the home position is located outside the tracker, so the R0 position is a non-zero number; about 0.1 meter might be a typical value. Thermal expansion causes variation in this value. For example, if the tracker structure is made of aluminum, then over a 10 degree Celsius change in temperature a value of R0 of 0.1 meter will change by approximately 20 micrometers (20 ppm/deg C.×10 deg C.×0.1 meter=20 micrometers). Temperature sensors can be embedded into the tracker structure to compensate for the thermal expansion. However, the correction will not be perfect and an error of at least a few micrometers will probably result from a large change of temperature.

Provision of the present chopper within an ADM assembly advantageously reduces this error by embedding an internal reference retroreflector within the laser tracker at a distance from the tracker exit aperture that can be made to nearly equal the distance of the tracker origin from the tracker exit aperture. Since the value of R0 can be made arbitrarily small, the R0 error caused by the thermal expansion of the tracker frame can also be made arbitrarily small.

The present chopper-stabilized absolute distance meter can be attached to or embedded within any sort of device for which distance information is important. Without limitation, such devices may rotate as in the case of the laser tracker, move rectilinearly as in the case of a gantry, move in a complex pattern as in the case of a robot end effector, or remain essentially stationary as in the case of a one-dimensional distance meter. From the discussion above, it will be clear to one skilled in the art how to adapt the chopper-stabilized ADM to these devices.

It will be apparent to those skilled in the art that, while exemplary embodiments have been shown and described, various modifications and variations can be made in the chopper-stabilized ADM without departing from the spirit or scope of the invention. For example, without limitation, any number of optical components may be utilized to direct a laser signal to different points on the exemplary chopper rotatable surface, including optical fibers, mirrors, lenses, beam splitters and prisms, among others. Accordingly, it is to be understood that the various embodiments have been described by way of illustration and not limitation.

What is claimed is:

1. An absolute distance measurement device including reference and measurement laser signal paths, comprising:
    a laser source providing a laser signal;
    a chopper assembly, comprising a rotatable surface defining at least one aperture provided through a portion of the rotatable surface;
    wherein the laser signal is directed to different points on the rotatable surface of the chopper assembly such that as the rotatable surface is rotated, the aperture selectively permits transmission and selectively prevents transmission of each of said at least two laser signal paths;
    a reference retroreflector, provided on said reference laser signal path; and
    an absolute distance meter, which determines the distance from said reference retroreflector positioned on a reference path to a target positioned on a measurement path.

2. The absolute distance measurement device of claim 1, wherein the laser signal is directed to different points on the rotatable surface by one or more of an optical fiber, mirror, lens, beam splitter and prism.

3. The absolute distance measurement device of claim 1, further comprising at least one optical fiber, which is configured to transmit a laser signal derived from said laser source.

4. The absolute distance measurement device of claim 3, wherein at least one optical fiber is positioned between the laser source and the rotatable surface.

5. The absolute distance measurement device of claim 4, wherein said at least one optical fiber is coupled to a fiber optic coupler at a first end thereof, and wherein said fiber optic coupler is coupled to two optical fibers at a second end thereof, the said two optical fibers directing a laser signal to different points on said rotatable surface.

6. The absolute distance measurement device of claim 5, wherein said two optical fibers coupled to said fiber optic coupler at a second end thereof are of substantially the same overall lengths.

7. The absolute distance measurement device of claim 4, wherein said at least one optical fiber outputs a laser signal, and wherein said laser signal is directed to different points on said rotatable surface by a beam splitter and by a mirror.

8. The absolute distance measurement device of claim 2, wherein said rotatable surface is reflective.

9. The absolute distance measurement device of claim 8, wherein said rotatable surface reflects laser light to at least one beam block.

10. The absolute distance measurement device or claim 2, wherein said laser signal is passed through a collimating lens prior to being directed to different points on said rotatable surface.

11. The absolute distance measurement device of claim 3, wherein at least one optical fiber is positioned between the rotatable surface and at least one of a reference retroreflector and a target provided on a measurement path.

12. The absolute distance measurement device of claim 11, wherein said at least one optical fiber is provided at least partially along a reference path terminated by a reference retroreflector, wherein said reference retroreflector is one of a fiber retroreflector or a corner cube retroreflector.

13. The absolute distance measurement device claim 11, wherein at least one optical fiber is provided at least partially along a reference path terminated by a retroreflector, and wherein at least one optical fiber is provided at least partially along a measurement path directed towards a target; and further wherein said at least one optical fiber provided along said reference path and said at least one optical fiber provided along said measurement path are of substantially the same overall lengths.

14. The absolute distance measurement device of claim 1, wherein said chopper assembly further comprises a chopper motor operatively associated with said rotatable surface.

15. The absolute distance measurement device of claim 14, wherein said chopper assembly further comprises an angle sensor operatively associated with said chopper motor.

16. The absolute distance measurement device of claim 1, wherein said aperture selectively permits transmission of at least one of said at least two laser signal paths to a reference retroreflector.

17. The absolute distance measurement device of claim 1, wherein said aperture selectively permits transmission of at least one of said at least two laser signal paths to a target provided along a measurement path.

18. The absolute distance measurement device of claim 17, wherein a diochroic beam splitter is provided between said aperature and said target.

19. The absolute distance measurement device of claim 18, further comprising an optoelectronic assembly providing an optoelectronic laser signal to said dichroic beam splitter, such that the dichroic beam splitter combines the outgoing optoelectronic laser signal and the outgoing laser signal passing through the aperture of the rotatable surface and along the measurement path.

20. The absolute distance measurement device of claim 19, wherein the optoelectronic laser signal has a wavelength in the visible range.

21. The absolute distance measurement device of claim 1, wherein the laser source provides a laser signal having a wavelength in the near infrared range.

22. The absolute distance measurement device of claim 19, wherein the optoelectronic assembly further includes an interferometric distance-measuring device.

23. The absolute distance measurement device of claim 1, wherein said laser source is provided within auxiliary assembly remote relative to said chopper assembly.

24. The absolute distance measurement device of claim 1, wherein a reflected laser signal is directed to an optical detector by a coupler.

25. The absolute distance measurement device of claim 24, wherein said reflected laser signal is prevented from destabilizing said laser source by an isolator positioned between said coupler and said laser source.

26. The absolute distance measurement device of claim 24, wherein said optical detector provides an electrical output signal, which is applied to a radio frequency port of a mixer.

27. The absolute distance measurement device of claim 26, wherein an electrical signal generator applies a signal to a local oscillator port of said mixer.

28. The absolute distance measurement device of claim 27, wherein said mixer produces an intermediate frequency signal, which is passed to a phase meter.

29. The absolute distance measurement device of claim 28, wherein a reference oscillator provides a reference signal to said electrical signal generator and to said phase meter.

30. The absolute distance measurement device of claim 28, wherein said phase meter provides a succession of phase values to a microprocessor, which determines the distance from a reference retroreflector positioned on a reference path to a target positioned on a measurement path.

31. An absolute distance measurement device including reference and measurement laser signal paths, comprising:

a laser source providing a laser signal;

a chopper assembly, comprising a rotatable surface defining at least one aperture provided through a portion of the rotatable surface;

wherein the laser signal is directed to different points on the rotatable surface of the chopper assembly such that as the rotatable surface is rotated, the aperture selectively permits transmission and selectively prevents transmission of each of said at least two laser signal paths; and a phase meter providing a succession of phase values to a microprocessor, which determines the distance from a reference retroreflector positioned on a reference path to a target positioned on a measurement path.

* * * * *